United States Patent [19]

Eisenmenger et al.

[11] 4,221,772
[45] Sep. 9, 1980

[54] CARBON BLACK FOR LACQUERS AND PIGMENTS

[75] Inventors: Edith Eisenmenger, Offenbach; Gerhard Kühner, Hanau; Lothar Rothbühr, Hürth-Hermülheim; Hans Schäfer, Linsengericht, all of Fed. Rep. of Germany

[73] Assignee: Deutsche Gold- und Silber-Scheideanstalt Varmals Roessler, Frankfurt, Fed. Rep. of Germany

[21] Appl. No.: 867,182

[22] Filed: Jan. 4, 1978

[30] Foreign Application Priority Data

Jan. 12, 1977 [DE] Fed. Rep. of Germany ....... 2700940

[51] Int. Cl.$^2$ ..................... C01B 31/00; C01B 31/02; C04B 31/02
[52] U.S. Cl. ................................. 423/445; 423/460; 106/307
[58] Field of Search ............... 423/445, 450, 460, 461; 106/307

[56] References Cited

U.S. PATENT DOCUMENTS

| 3,330,799 | 7/1967 | Voet ................. 106/307 X |
| 3,383,232 | 5/1968 | Jordan et al. .......... 106/307 |
| 3,409,406 | 11/1968 | Murray ............. 423/458 X |
| 3,415,775 | 12/1968 | Solsten ............... 106/307 |
| 3,787,562 | 1/1974 | Heller et al. ........ 106/307 X |
| 3,865,926 | 2/1975 | Vanderveen .......... 423/456 |
| 4,014,654 | 3/1977 | Howell ............. 23/259.5 |
| 4,075,156 | 2/1978 | Johnson ........... 423/460 X |

FOREIGN PATENT DOCUMENTS 1596496 7/1970 France .
1041848 9/1966 United Kingdom .

Primary Examiner—O. R. Vertiz
Assistant Examiner—Gregory A. Heller
Attorney, Agent, or Firm—Cushman, Darby & Cushman

[57] ABSTRACT

There is prepared carbon black having the following properties:

| Primary particle size | nm | 35-120 |
|---|---|---|
| BET surface area | m$^2$/g | 10-50 |
| Iodine adsorption | mg/g | 10-55 |
| Volatile/content | % | 2-8 |
| pH value | | 3-6 |
| Acidity | ml n/10 acid per 100 grams of carbon black | 2-16 |
| DBP number | ml/100 grams | 40-140 |

The carbon black is useful in producing gray lacquers, multi-colored lacquers and in making low viscosity and storage stable preliminary pastes suitable for use in lacquers.

4 Claims, No Drawings

CARBON BLACK FOR LACQUERS AND PIGMENTS

BACKGROUND OF THE INVENTION

Lacquers and enamels are added today to the greatest extent to protect different surfaces, to improve the appearance and to fulfill specific color psychological and physical-industrial functions, e.g., as warning colors, electrically conducting, IR-reflecting and sunlight absorbing coatings.

By the term enamels there is understood solutions, suspensions or dispersions of polymers or polymer forming materials treated with pigments, e.g., with carbon black in which there occurs forming the lacquer film by physically drying, i.e., by evaporation of the solvent or forming a film on the surface of objects to be coated by oxidation or reaction.

Important binders for the different lacquer systems are for example alkyd resins, melamine resins (e.g., melamine-formaldehyde resins), polyol-polyisocyanate (polyurethanes), polyacrylate resins, epoxide resins, chlorinated rubber, etc.

Depending on the intended area of use, different specific requirements are placed on the appearance and the resistance of the coatings. The binder and the color imparting pigments must be correct for the requirements placed thereon. In only a few cases are individual pigments added for coloration, e.g., for black coatings carbon black, for white coatings titanium dioxide, however, predominantly there are added mixtures of pigments in order to produce the desired color tones which are infinitely numerous.

For the production of black lacquers for many years there has been approved carbon black. This black pigment in contrast to all competitive products has the advantage of high depth of color and very good light stability. Deep black lacquers are produced today with specially adjusted high value color blacks which have the following physical-chemical characteristics:

| Primary particle size determined electron-microscopically | nm | 10–25 |
|---|---|---|
| BET surface area | m²/g | 100–800 |
| Volatile content | % | 5–20 |
| pH value | | 3–5 |

Typical members of this class are, for example, the color blacks FW 1 ®, FW 200 ®, FW 2 ®, S 170 ®, S 160 ®, Spezialschwarz 5 ® and Spezialschwarz 4 ® of DEGUSSA.

Besides their use for the production of black full tone paints carbon black is of great significance as a partial tone pigment. Carbon black finds use not only for gray shades in various steps of lightness and nuances but also in establishing the gray value of multi-color tones. For this use, however, there are considerable difficulties with the precedingly mentioned carbon blacks. Because of the finely divided state of these carbon blacks there are produced, e.g., with mixing with white pigments only brownish color tones.

To overcome the named disadvantages coarse particle carbon blacks were added which could be produced according to the lamp black process and the furnace black process. As coarse particle in this connection there is understood carbon blacks whose electron microscopically determined particle size is greater than 35 nm and which have an iodine adsorption according to DIN 53582 (German Industrial Standard 53582) of less than 60 mg/g. These carbon blacks to be sure have less strength of color but in mixing with the white material show the preferred bluish color tone. However, they have the undesired property of flushing out in pigment mixtures. By "flushing out" there is understood that after the application of the color varnish (or color lacquer) there occurs a gradual distinct separation of the, e.g., white base pigment (predominantly titanium dioxide) and the black shading pigment. The separation can be expressed in such a manner that the carbon black flushes out in horizontal and/or vertical direction. This phenomenon is very undesired since through this the reproducibility of the desired color tone is made difficult. The basis for the flushing out is frequently sought for in the very different relative sizes of the white pigment (titanium dioxide) and the shading pigment (carbon black).

Titanium dioxide is much coarser than the coarsest carbon black. Also charging ratios are made responsible for the flushing out. There are not attempts to keep the flushing out effect within limits by using various procedures, e.g., by using wetting agents and by increase of the structural viscosity of the lacquer. These procedures, however, have had only a limited success.

SUMMARY OF THE INVENTION

Surprisingly, it has been found that coarse carbon blacks are outstandingly suited as blacks resisting flushing out in lacquer systems if they are altered by an oxidation process. The object of the present invention is the development of carbon blacks having the following physical-chemical properties:

| Primary particle size determined electron-microscopically | nm | 35–120 |
|---|---|---|
| BET surface area | m²/g | 10–50 |
| Iodine adsorption | mg/g | 10–55 |
| Volatile content | % | 2–8 |
| pH value | | 3–6 |
| Acidity | ml N/10 acid per 100 grams of carbon black | 2–16 |
| DBP number (dibutyl phthalate number) | ml/100 grams | 40–140 |

The production of the carbon black types of the invention can take place starting from coarse particle furnace blacks of the above stated particle size, surface area and structural scope by an oxidation. The oxidation can take place by leading nitrogen dioxide and air at a temperature of 80°–200° C. over or through the carbon black.

Excess nitrogen dioxide is subsequently displaced by air. The proportion of volume/h air and nitrogen dioxide can be 5 to 20, whereby the oxidation procedure can last about 0.5 to 2 hours.

A further object of the invention is the use of the carbon blacks of the invention for the production of gray lacquers and multi-colored lacquers having a gray component as well as their use for the production of low viscosity and storage stable preliminary pastes suitable for use in making lacquers.

The carbon blacks of the invention show an excellent workability in practically all lacquer systems. Depending on the pigment wetting capacity of each binder the carbon blacks of the invention can be sufficiently dispersed merely by stirring in, e.g., with a Dissolver.

Because of the favorable rheological properties it is possible to produce carbon black pastes having a relatively high portion of carbon blacks. All in all the carbon blacks of the invention impart definite advantages in working into lacquer systems. The advantages are demonstrated in the following examples which further explain the objects of the invention, but which are not limiting.

The compositions can comprise, consist essentially of or consist of the materials set forth and the process can comprise, consist essentially of or consist of the steps set forth.

Unless otherwise indicated all parts and percentages are by weight.

DESCRIPTION OF THE PREFERRED EMBODIMENTS

There were employed the following analytical carbon black testing methods to ascertain the physical-chemical properties of the carbon blacks.

Primary particle size:

The primary particle size is ascertained by electron microscopic photographs and the calculation of the arithmetic average of the primary particle diameters.

BET surface area:

Surface area determination by nitrogen adsorption according to Brunauer, Emmet and Teller - DIN 66 131.

Iodine adsorption:

According to DIN 53 582.

Volatile content:

According to DIN 53 592, but with 1 gram weighed portion.

pH value:

According to DIN 53 200.

DBP number:

According to ASTM D 2414/70.

Acidity:

10 grams of carbon black are boiled with 150 ml of distilled water, filtered through a fluted filter and the filter residue subsequently sprayed with 100 ml of distilled water. The total filtrate is titrated against 0.05 N sodium hydroxide in comparison to a blind value without carbon black.

Calculation:

(consumption NaOH−blind value)×5=acidity 0.1 N acid/100 grams carbon black.

Table 1 gives the physical-chemical properties of the carbon blacks used in the examples.

Table 2 gives the compositions of the test lacquers with the examples.

Table 1

| Carbon Black Type | Iodine Adsorption | BET-Surface Area | Primary Particle Diameter | Volatile content | DBP Number | pH Value | Acidity ml n/10 Acid per 100 g Carbon Black |
|---|---|---|---|---|---|---|---|
| Printex A | 55 | 46 | 41 | 1.5 | 130 | 8.7 | 0 |
| Printex G | 38 | 31 | 51 | 1.5 | 99 | 8.5 | 0 |
| Flammruss 101 | 30 | 21 | 95 | 1.8 | 110 | 7.5 | 0 |
| Russ SRF-HS | 40 | 22 | 80 | 1.9 | 110 | 7.5 | 0 |
| Printex 200 | 40 | 34 | 45 | 2.0 | 55 | 9.2 | 0 |
| carbon black 1 according to invention | 45 | 45 | 42 | 3.0 | 120 | 4.8 | 3 |
| carbon black 2 according to invention | 31 | 26 | 53 | 4.7 | 94 | 3.1 | 16 |
| carbon black 3 according to invention | 25 | 20 | 100 | 4.3 | 110 | 3.8 | 5 |
| carbon black 4 according to invention | 21 | 22 | 82 | 3.0 | 104 | 3.4 | 11 |
| carbon black 5 according to invention | 25 | 35 | 44 | 3.3 | 60 | 3.3 | 13 |

Table 2

| Enamel test formulations | Weight Percent | | |
|---|---|---|---|
| | No. 1 | No. 2 | No. 3 |
| Scadonal ® 120 × 60* | 48.400 | 48.400 | — |
| Maprenal ® MF 800, 55%** | 22.600 | 22.600 | — |
| Degalan ® LS 150/300*** | — | — | 40.200 |
| Desmodur ® N 75**** | — | — | 14.300 |
| Xylene | 7.000 | 6.970 | 11.000 |
| Butanol | 0.900 | 0.900 | — |
| Ethyl Glycol (2-Ethoxyethyl alcohol) | 1.400 | 1.400 | — |
| Ethyl Glycol Acetate (2-Ethoxyethyl acetate) | 1.100 | 1.100 | 11.620 |
| Baysilonol ® A, 10% in xylene (organopolysiloxane) | 1.600 | 1.600 | — |
| Titanium Dioxide Kronos ® RN 56 | 16.700 | 16.700 | 22.000 |
| Carbon Black | 1 | 2 | 0.440 |
| Commercial Wetting Agent***** | 0.150 | — | — |
| AEROSIL ® 200 (pyrogenic silica) | 0.150 | 0.330 | 0.440 |
| | 100.000 | 100.000 | 100.000 |

[1]Comparison Example 1
[2]Comparison Example 2
*(resin of phthalic acid modified with soybean oil)
**(melamine resin in isobutyl alcohol)
***(polyacrylate resin for crosslinking with polyisocyanate resin) (60% in ethylglycolacetate (2-Ethoxyethylacetate)/Xylene 1:1)
****(aliphatic isocyanate 75% in ethylglycolacetat (2 Ethoxyethylacetat)/Xylene 1:1)
*****(Salt of Polyaminemide with long chains and a highmolecular, acidic ester)

EXAMPLE 1

Using the carbon blacks set forth in Table 1 there were produced on a three roller mill carbon black pastes from 30 weight % carbon black and a standard lacquer solution of the following composition:

| | |
|---|---|
| 69.6 weight % | medium fat soya modified alkyd (Alftalat ® AS 502, 50% in mineral spirits) |
| 29.8 weight % | Testbenzin K 30 (mineral spirits) |
| 0.6 weight % | antiskinning agent, Ascinin R 55 (Bayer AG) (volatile oxime iodine color number DIN 6162 max. 1, specific gravity DIN 51 757 about 0.85 g/ml, flame point over 30° C. DIN 53 213) |
| 100.0 weight % | |

1.113 grams of this paste were added to 100.0 grams of the test lacquer 1 and the composition intensively mixed. A lacquer film of 90 μm was applied to glass from this lacquer. After 5 minutes drying a portion of the lacquer film was rubbed out with a finger. In non-flushing out gray lacquers the difference in the color strength of the rubbed out portion to the non-rubbed out portion is small, in flushing out gray lacquers on the other hand it is large. After complete drying of the lacquer therefore the color strength differences are measured with a color measuring apparatus and maintained quantitative. Minus values signify a higher color strength of the rubbed out surface in comparison to the non-rubbed out; plus values indicate a lower color strength in comparison to the non-rubbed out.

| | |
|---|---|
| PRINTEX® A | −24 |
| PRINTEX® G | −79 |
| Flammruss 101® | −19 |
| Russ SRF-HS | −28 |
| PRINTEX® 200 | −108 |
| Carbon black 1 according to invention | −4 |
| Carbon black 2 according to invention | −4 |
| Carbon black 3 according to invention | −6 |
| Carbon black 4 according to invention | +4 |
| Carbon black 5 according to invention | −16 |

From these results it can be gathered that the carbon blacks of the invention clearly depart from the known carbon blacks in an enormously reduced inclination to flush out.

EXAMPLE 2

The pastes described in Example 1 were used with a carbon black content of 30% and in each case 1.113 grams were stirred into 100.0 grams of test lacquer 2. As described in Example 1 again there was applied a lacquer film having a thickness of 90 μm and after five minutes drying a portion of the lacquer coating rubbed. The color strength differences measured after drying were recorded as follows:

| | |
|---|---|
| PRINTEX® A | −12 |
| PRINTEX® G | −34 |
| Flammruss 101® | −6 |
| Russ SRF-HS | −25 |
| PRINTEX® 200 | −95 |
| Carbon black 1 according to invention | −1 |
| Carbon black 2 according to invention | −1 |
| Carbon black 3 according to invention | +1 |
| Carbon black 4 according to invention | +11 |
| Carbon black 5 according to invention | +2 |

The lacquer system used in Example 2 differs from that used in Example 1 in that a conventional wetting agent is no longer contained in the recipe. By this procedure the mode of action of the carbon blacks of the invention is still better illustrated.

EXAMPLE 3

There were produced in a laboratory dispersing apparatus of the type "Red Devil" a gray, carbon black and titanium dioxide containing two component lacquer pigment corresponding to test lacquer No. 3. The carbon black content based on the titanium amounted to 2%. After the application into 90 μm wet film strength after five minutes the drying was again rubbed out and the two portions of the lacquer coating measured in regard to film strength difference.

| | |
|---|---|
| PRINTEX® A | −56 |
| PRINTEX® G | −21 |
| Flammruss 101® | −85 |
| Russ SRF-HS | −67 |
| PRINTEX® | −77 |
| Carbon black 1 according to invention | −8 |
| Carbon black 2 according to invention | −4 |
| Carbon black 3 according to invention | −26 |
| Carbon black 4 according to invention | +10 |
| Carbon black 5 according to invention | +5 |

Even with this direct working in of the carbon black into the gray lacquer there resulted a considerable improvement in the flushing out properties compared to known carbon blacks.

EXAMPLE 4

This example demonstrates the fact that the carbon blacks of the invention in addition to the good flushing out properties have the advantage that there can be produced with them carbon black pastes with unusually small viscosities. This is of great significance for the working up in practice. To be sure hereby there may only be compared carbon blacks which correspond approximately in their surface area size and in their structure. The binder for the pastes has the following composition:

| | |
|---|---|
| 69.6 weight % | medium fat soya modified alkyd (Alftalat® AS 502, 50% mineral spirits) |
| 29.8 weight % | Testbenzin K 30 (mineral spirits) antiskinning |
| 0.6 weight % | agent (see Example 1) |
| 100.0 weight % | |

Viscosity After 14 Days (Shearing Speed 8 sec$^{-1}$)

| | |
|---|---|
| 30% PRINTEX® A | 77,000 cps |
| 30% Carbon Black 1 according to Example 1 of the invention | 5,500 cps |

The paste with the carbon black of the invention at equal carbon black concentration is substantially less viscous that the corresponding paste with known carbon black. The same effect is also established if pastes with known, low structured carbon blacks are compared with the low structured carbon blacks obtained according to the invention. The binder is the same as previously.

| Viscosity After 10 Days (Shearing Speed 8 sec$^{-1}$) | |
|---|---|
| 30% PRINTEX 200 | 2,900 cps |
| 30% Carbon Black 5 of the invention | 1,100 cps |

EXAMPLE 5

Production of a Carbon Black of the Invention

As starting carbonblack for the production of a carbon black of the invention a carbonblack with the following properties is used:

| | | |
|---|---|---|
| Iodine adsorption | mg/g | 38 |
| BET-surface area (ASTM D 3037-76) | m$^2$/g | 32 |
| Primary particle size determined electron-microscopically | nm | 51 |

| -continued | | |
|---|---|---|
| Volatile content (DIN 53 552) | % | 1.3 |
| DBP-number (ASTM D 3493-76) | ml/100 g | 99 |
| pH-value (ASTM D 1512-75) | | 8.5 |
| Acidity (DIN 53 202) | ml/100 g | 0 |

10 kg of this carbonblack were filled in a container and streamed with a mixture of 2 Nm$^3$/h warm air (100° C. and 0.15 Nm$^3$/h nitrogen dioxide (NO$_2$) 1 hour. After this the addition of nitrogen dioxide was finished and the addition of air raised to 8 Nm$^3$/h. After 2 hours the process was stopped and the carbon black removal from the container. The reaction temperature rises during this process to 120° C. and falls during the blow down. The analytical data of the carbonblack of the invention are as follows:

| | | |
|---|---|---|
| Iodine adsorption (ASTM D 1510-76) | mg/g | 20 |
| BET-surface area (ASTM D 3037-76) | m$^2$/g | 32 |
| Primary particle size determined electronmicroscopically | nm | 51 |
| Volatile content (DIN 53 552) | % | 4.3 |
| DBP-number (ASTM D 3493-76) | ml/100 g | 95 |
| pH value (ASTM D 1512-75) | | 3.1 |
| Acidity (DIN 53 202) | ml/100 g | 16 |

What is claimed is:

1. A carbon black outstandingly suited as a black resisting flushing out in pigmented lacquers and for the production of low viscosity and storage stable pigmented pastes prepared by a process comprising oxidizing with nitrogen dioxide a furnace black having the following properties

| Primary particle size | nm | 35–120 |
|---|---|---|
| BET surface area | m$^2$/g | 10–50 |
| Iodine adsorption | mg/g | 10–55 | said carbon black having the following properties:

| Primary particle size | nm | 35–120 |
|---|---|---|
| BET surface area | m$^2$/g | 10–50 |
| Iodine adsorption | mg/g | 10–55 |
| Volatile/content | % | 2–8 |
| pH value | | 3–6 |
| Acidity | ml n/10 acid per 100 grams of carbon black | 2–16 |
| DBP number | ml/100 grams | 40–140 |

2. A carbon black according to claim 1 wherein the oxidation is carried out with a mixture of nitrogen dioxide and air at a temperature of 80°–200° C.

3. A process of producing the carbon black having the following properties:

| Primary particle size | mm | 35–120 |
|---|---|---|
| BET surface area | m$^2$/g | 10–50 |
| Iodine adsorption | mg/g | 10–55 |
| Volatile/content | % | 2–8 |
| pH value | | 3–6 |
| Acidity ml/10 acid per 100 grams of carbon black | | 2–16 |
| DBP number ml/100 grams | | 40–140'' | comprising oxidizing with nitrogen dioxide a furnace black having the following properties:

| Primary particle size | nm | 35–120 |
|---|---|---|
| BET surface area | m$^2$/g | 10–50 |
| Iodine adsorption | mg/g | 10–55 |

| Primary particle size | nm | 35–120 |
|---|---|---|
| BET surface area | m$^2$/g | 10–50 |
| Iodine adsorption | mg/g | 10–55 |

4. A process according to claim 3 comprising oxidizing the furnace black with a mixture of nitrogen dioxide and air at 80°–200° C.

* * * * *